March 10, 1964
B. A. TUCKER
3,124,696
POWER UNIT INCLUDING A REFRIGERANT POWER
CYCLE AND HYDRAULIC SYSTEM FOR
DRIVING GENERATOR
Filed Jan. 25, 1961
3 Sheets-Sheet 1
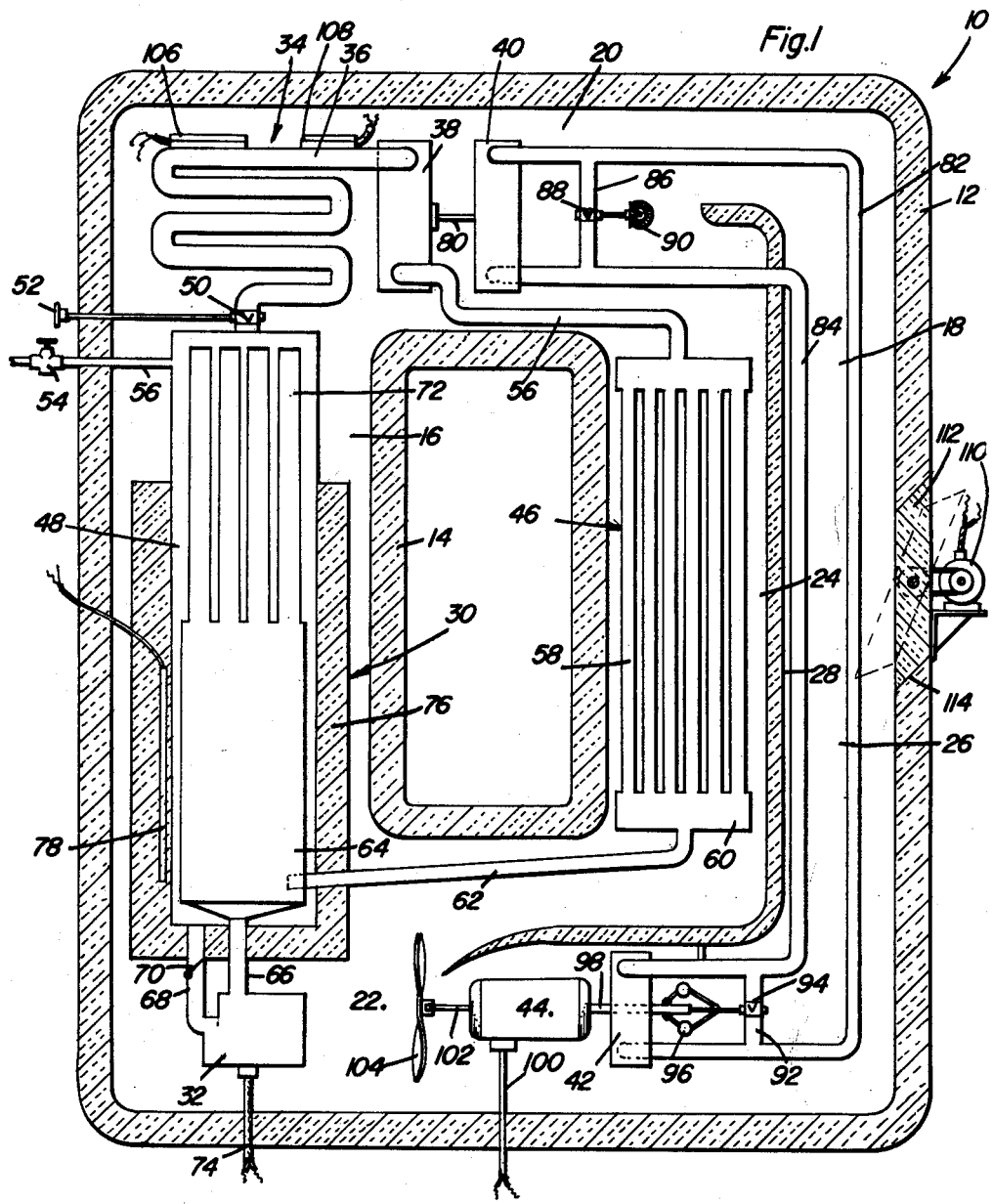
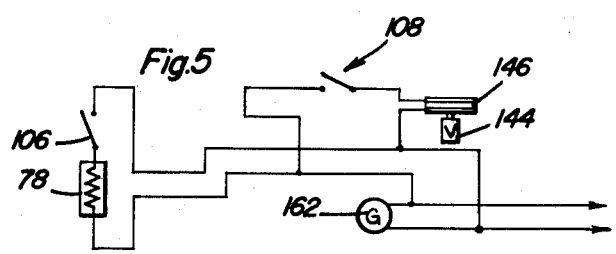
Burnell A. Tucker
INVENTOR.

March 10, 1964
B. A. TUCKER
3,124,696
POWER UNIT INCLUDING A REFRIGERANT POWER
CYCLE AND HYDRAULIC SYSTEM FOR
DRIVING GENERATOR
Filed Jan. 25, 1961
3 Sheets-Sheet 2
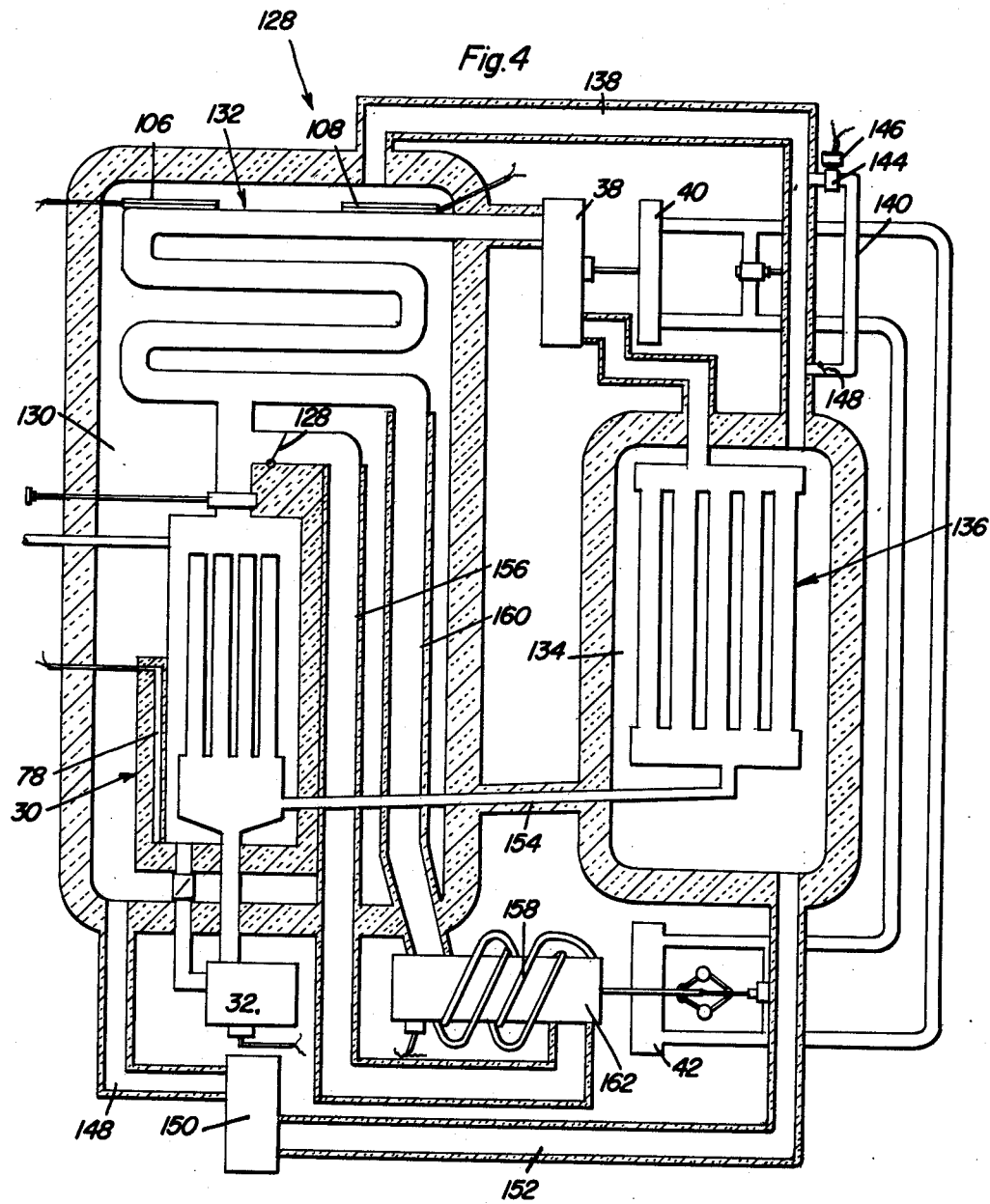
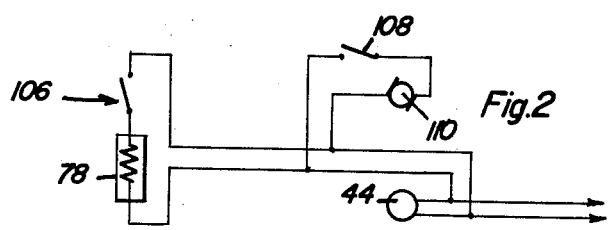
Burnell A. Tucker
INVENTOR.

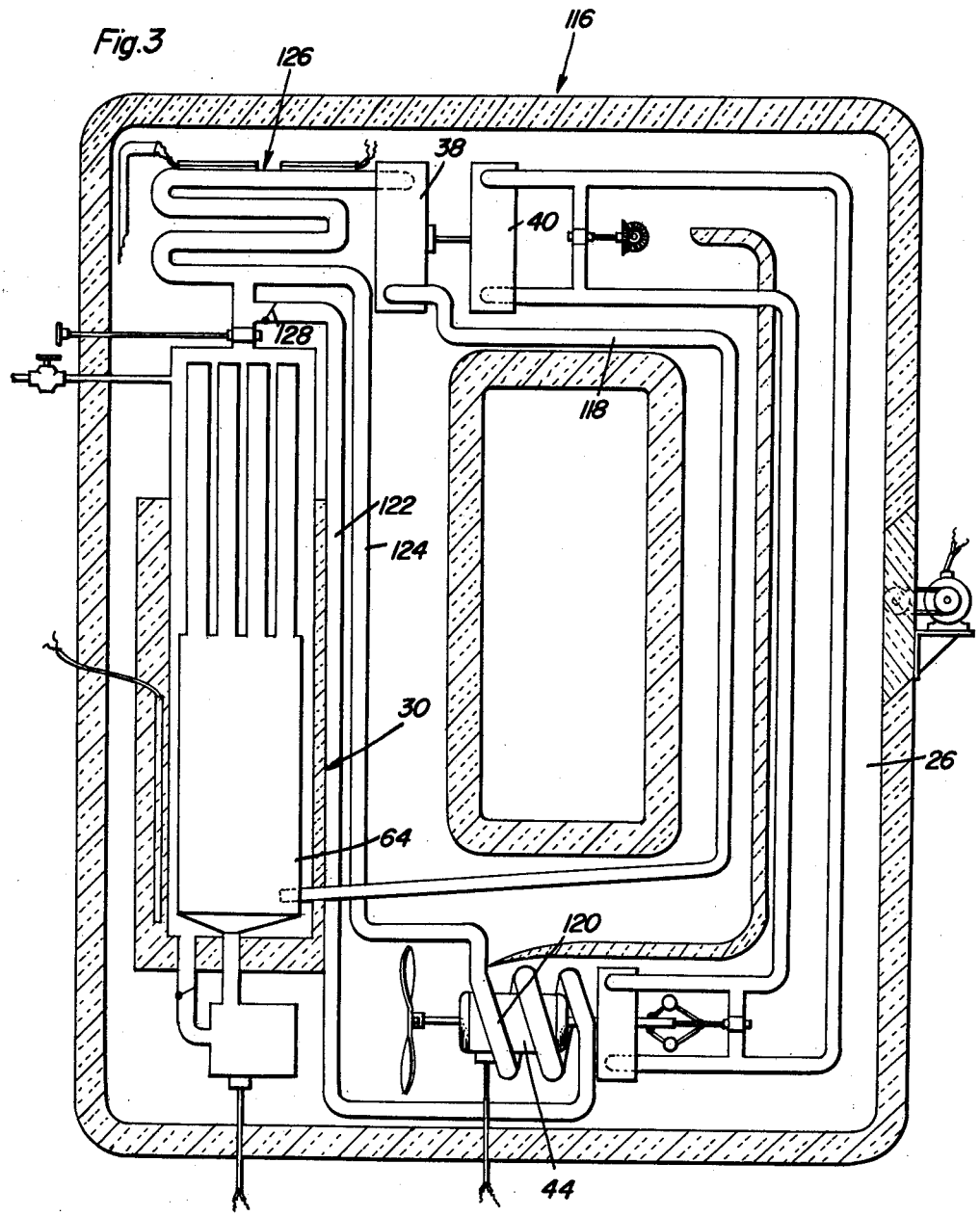

United States Patent Office 3,124,696
Patented Mar. 10, 1964

3,124,696
POWER UNIT INCLUDING A REFRIGERANT POWER CYCLE AND HYDRAULIC SYSTEM FOR DRIVING GENERATOR
Burnell A. Tucker, 1233 Penmar Ave. SE., Roanoke, Va.
Filed Jan. 25, 1961, Ser. No. 84,867
20 Claims. (Cl. 290—52)

The present invention relates to a system for producing usable power from a closed circuit refrigerant cycle. More particularly, this invention relates to a self-contained power unit in which a fluid turbine is operated by the evaporated refrigerant of the closed refrigerant circuit, which is so arranged as to produce a constant pressure drop in the circulating refrigerant as it passes through the turbine so as to provide uniform and constant turbine operation by means of which an out-put power generator is driven through a hydraulic conversion system.

It is therefore a primary object of this invention to provide a method and apparatus for producing usable power by a power unit capable of operating at lower temperatures in a constant and uniform manner, with no losses due to heat dissipation when fully loaded.

Another object of this invention is to provide a power unit which is characterized by a stand-by operation which renders the unit immediately operative to supply useful power when loaded.

A further object of this invention is to provide a power unit featuring a turbine which removes kinetic energy from a closed refrigerant circuit in which the refrigerant passing through the turbine undergoes a constant pressure drop which is maintained under all conditions for constant and uniform operation of the turbine.

An additional object of this invention is to provide a power unit which is automatically adjustable between stand-by and loaded operation to deliver power at a low temperature without any heat losses due to heat dissipation from the power delivery portions of the power unit.

The power unit made in accordance with the present invention, involves a closed circuit refrigerant cycle which refrigerant is evaporated from an evaporator or heat exchanger unit for supply to the turbine through a heating coil in which the evaporated refrigerant gas is brought up to a predetermined temperature and pressure for operating the turbine. The lower pressure refrigerant gas leaving the turbine is then returned to a condenser unit and cooled therein by heat exchange with evaporating liquid refrigerant. The low pressure refrigerant converted to liquid within the condenser unit is therefore received within a refrigerant circulating pump for pressurized return to the evaporator for evaporation therewithin. Insulated fluid passages are disposed within the power unit for the purpose of conducting a carrier fluid therewithin. Disposed within the insulated passages for exposure to the carrier fluid, is a portion of the evaporator unit with the remainder of the evaporator unit being insulated from the carrier fluid. Also exposed to the carrier fluid is the evaporated refrigerant gas heating coil and the energy conversion unit by means of which the motive power from the turbine is converted into electrical energy. The carrier fluid is accordingly circulated through the insulated passages for the purpose of supplying heat to the heating coils afore-mentioned, which conducts the evaporated refrigerant gas to the turbine. The generator portion of the converting unit is cooled thereby so as to prevent loss of the heat dissipated therefrom which dissipated heat is supplied by the circulating carrier fluid to the heating coils for heating thereof. The circulating carrier fluid may also be operative to reduce the temperature of the low pressure refrigerant gas leaving the turbine as the carrier fluid is circulated through the passages. The carrier fluid also is effective to additionally cool the condenser unit after the heat is absorbed therefrom by the heating coils so that the cooled carrier fluid will effectively absorb the dissipated heat from the generator. In order to maintain the turbine unit constantly operative as hereinbefore indicated, and also to maintain the power unit in stand-by operation, a heating unit is provided in the evaporator unit for increasing its refrigerant evaporating rate and a heat flow venting damper is provided for one of the ducts in the insulated passage leading to the heating coils, so that the supply of heat to the heating coils may be reduced. Both the evaporator heater and the heat flow venting mechanism are controlled by thermostat devices which respond to the temperature of the heating coil adjacent to the portion thereof constituting the inlet to the turbine. A highly efficient and constantly operating power unit is thereby realized.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a schematic cross-section view illustrating the power system of the present invention.

FIGURE 2 is a schematic circuit diagram of the control unit of the system illustrated in FIGURE 1.

FIGURE 3 is a schematic sectional view of another power system made in accordance with this invention.

FIGURE 4 is a schematic sectional view of a third power system made in accordance with this invention.

FIGURE 5 is a circuit diagram of the control units of the power system illustrated in FIGURE 4.

Referring now to the drawings in detail, attention is invited toward FIGURE 1 which illustrates one form of power unit generally indicated by reference numeral 10 which embodies the principles and concepts of the present invention. The power unit 10 being a self-contained unit is housed within an insulated casing 12 of suitable material to reduce to a minimum the transfer of heat between the equipment located within the casing 12 and the surrounding atmosphere. It will be observed, that disposed within the casing 12 is an inner insulated wall member 14 which is provided for the purpose of forming a continuous passageway within the outer casing 12 including parallel opposite side portions 16 and 18 which are interconnected by an upper passage portion 20 and a lower passage portion 22. The side passage portion 18 and part of the lower passage portion 22 are separated into two ducts 24 and 26 insulated from each other by an insulated partition wall member 28. The operating equipment of the power unit 10 is accordingly located within the insulated passages. Disposed within the side passage 16 is an evaporator or heat exchanger unit generally referred to by reference numeral 30 which is operatively connected to a refrigerant circulating pump unit 32 disposed therebelow. Connected to the unit 30 and disposed thereabove is a heat coil unit 34 which is also connected by its upper portion 36 to a gas turbine unit 38. The gas turbine unit 38 which is located in the upper passage portion 20 is drivingly connected to a fluid pump mechanism 40. The fluid pump mechanism 40 is hydraulically connected to a fluid motor mechanism 42 located within a lower portion of duct 26 within the lower portion 22 of the insulated passages. Drivingly coupled to the fluid motor 42 is an output electric generator 44 by means of which useful power is delivered by the power unit 10. Also, disposed within the passage 24 of the side pasage portion 18 is a pre-cooling heat exchanger 46.

The refrigerant which may be of any suitable commercial type such as Freon is disposed within the outer chamber 48 of the evaporator unit 30 within which chamber it is evaporated into a gaseous form for entry into the heating coil unit 34. The evaporated refrigerant accordingly enters the heating coil unit 34 through a controllable throttle valve 50 controlled externally of the power unit 10 by the valve actuator 52. Supply of refrigerant to the external chamber 48 of the unit 30 may be effected through the supply valve 54 and the supply conduit 55 connected to the chamber 48 in order to fill the chamber 48 with a suitable refrigerant from an external source. The refrigerant is accordingly conducted by the heat coils of unit 34 into the turbine 38 from which it exits by a conduit 56. The conduit 56 is connected to the upper inlet end of the heat exchanger 46 for conducting the refrigerant downwardly through a plurality of heat transfer tubes 58. The lower outlet end 60 of the heat exchanger 46 is accordingly connected to an outlet conduit 62 disposed within the lower portion of the passage 23 for return of the refrigerant into the inner chamber 64 of the unit 30. The inner chamber 64 is connected at its lower end by the conduit 66 to the circulating pressure pump 32 to which the discharge conduit 68 is also connected. A one-way check valve 70 is provided in the discharge conduit 68 for supplying therethrough pressurized liquid refrigerant into the outer evaporating chamber 48 of the unit 30. The condensing chamber 64 of the evaporator unit is connected to a plurality of heat transfer tubes 72 at the upper portion thereof for bringing the gaseous refrigerant into heat transferring relation to the evaporating liquid refrigerant within the evaporating chamber 48 so as to condense the refrigerant within the inner chamber 64. Power for operating the circulating refrigerant pump 32 is derived from any suitable input source including possibly some power from the generator 44 through the electric power conduit 74.

It will be further noted, that the heat exchanger unit 30 includes an insulating casing 76 disposed about an insulated portion of the condenser unit leaving an upper portion thereof exposed within the passage portion 16 for purposes as will be hereafter explained. Also, embedded within the insluated casing 76 is a strip heater 78 which when energized will supply a certain amount of heat to the unit 30 so as to increase the rate of evaporation occurring therewithin for purposes as will be hereafter explained. From the foregoing description, circulation of the refrigerant in a closed circuit cycle will be apparent. The liquid refrigerant will accordingly be evaporated within the evaporator chamber 48 of the unit 30 for passage through the heating coil unit 34 in order to be passed through the turbine unit 38 for operation thereof. The gaseous refrigerant leaving the turbine 38 in conduit 56 will then be precooled within the heat exchanger 46 before return to the inner condensing chamber 64 of the condenser unit by the conduit 62. The condensed liquid refrigerant within the condensing chamber 64 is then drawn by the circulating pump 32 for return of the liquid refrigerant to the evaporating chamber 48 under pressure so as to effect evaporation thereof within the chamber 48.

Fluid pump 40 and fluid motor 42 constitute part of a power converting system for converting the motive power from the turbine 38 into useful electrical energy. The turbine shaft 80 driven by the turbine 38 accordingly imparts drive to the fluid pump 40 for the purpose of circulating fluid under pressure between a conduit 82 and a conduit 84 which interconnects the pump 40 and the motor 42. A pump by-pass passage 86 interconnects the condiut 82 and 84 adjacent the pump ends thereof, which by-pass passage 86 when controlled by a valve 88 for the purpose of variably and controllably by-passing a portion of the fluid being received by the pump through conduit 82 and discharged into conduit 84, may control the output of the pump 40. The valve 88 is controlled manually by gearing 90 to which a manual control is connected externally of the casing 12. Similarly disposed between the conduits 82 and 84 adjacent the motor ends thereof, is a motor by-pass passage 92 controlled by a valve 94, the position of which is determined by a centrifugal governor mechanism 96 which is connected to the output shaft 98 driven by the motor 42. Accordingly, operation of the motor 42 and the generator 44 connected thereto by the shaft 98, will be controlled in accordance with the speed of the motor 42 and generator 44 which will tend to maintain said speed constant. An electric power delivery conduit 100 delivers therefore electrical energy output from the generator 44. Also connected to the generator by shaft 102 is a circulating air fan 104 which is provided for the twofold purpose of circulating air through the insulated air passages in the direction indicated by the arrows in FIGURE 1 and also for removing from the casing of the generator 44 the heat energy that will be dissipated during operation of the generator. The air thus constitutes a heat carrier fluid.

In addition to the control over the operation of the power unit that may be effected by controlling the opening of the throttle valve 50 through the actuator 52 and the opening of the valves 88 and 94 respectively by the manually actuated gear mechanism 90 and the speed responsive mechanism 96, further controls are provided which are automatic in nature. The strip heater element 78 heretofore mentioned, is accordingly electrically connected to the output of the generator 44 for the purpose of introducing heat to the unit 30. The heating of the strip heater is however controlled by a thermostat control device 106 as schematically illustrated in FIGURE 2. It will therefore be apparent that the temperature of the evaporated refrigerant within the portion 36 of the heating coil unit 34 when reaching a predetermined value will cause operation of the strip heater 78 to thereby increase the rate of evaporation within the unit 30 in view of the elevation in temperature of the evaporating chamber 48 effected by the strip heater 78 to thereby increase flow of refrigerant in the closed circuit to reduce the heat absorbed in the heat coil unit 34. A second thermostatic control device 108 is provided on the portion 36 of the heating coil unit 34 for the purpose of controlling a damper control motor 110 as schematically illustrated in FIGURE 2. The motor 110 may accordingly be energized by the output of the generator 44 to control the position of a damper vane 112 from a solid line position illustrated in FIGURE 1 in which the duct passage 26 is effective to conduct all of the circulated air upwardly therethrough for the purpose of transferring heat to the heat coil unit 34, to another position such as that shown by dotted line in FIGURE 1 in which flow through the duct passage 26 is restricted and a portion of the heated air vented through the opening 114 in the casing 12.

From the foregoing description of the power unit 10, operation thereof will be apparent. In order to start operation of the unit, it will only be necessary to open valve 54 for admitting the requisite quantity of refrigerant into the evaporating chamber 48 of the condenser unit. Upon closing of the valve 54, the refrigerant will begin to evaporate and be conducted through the heating coil unit 34 into the turbine 38 for operation thereof. As soon as the turbine 38 begins to operate the fluid pump 40 will begin to circulate fluid through the conduits 82 and 84 for operating the fluid motor 42. The generator 44 will then begin to deliver output current through the power conduit 100. The air circulating fan 104 will then begin to operate to induce air flow through the duct passages in a counterclockwise direction as viewed in FIGURE 1. Accordingly, the air moving upwardly through the passages 24 and 26 will cool the refrigerant passing downwardly through the heat exchanger 46 so that when the circulating air reaches the upper passage portion 20 it will have absorbed heat energy therefrom and be at an elevated temperature. Furthermore, the air passing over the generator 44 if loaded will absorb therefrom the heat ordinarily dissipated from a loaded generator to elevate the temperature of the air passing through the passage 26. It will therefore be appreciated that the air when it reaches the upper portion 20 of the passages will be heated by absorbing the heat from the refrigerant within the heat exchanger 46 and may also be heated by the heat dissipated from the generator to thereby heat the evaporated refrigerant within the heating coil unit 34. The evaporated refrigerant will thereby be raised to a higher temperature and pressure before it passes through the turbine 38. The air after transfer of its heat to the evaporated refrigerant will be further cooled by the heat transfer to the liquid refrigerant in the exposed upper portion of the unit 30 so that when it arrives at the lower portion 22 of the insulated passages it may once again effectively absorb the dissipated heat from the generator 44 when entering the outside duct passage 26 and also effectively precool the refrigerant by passing upwardly about the heat transfer tube 58 of the heat exchanger 46.

During stand-by operation of the power unit, it will be appreciated that little heat will be dissipated by the generator 44 and that the speed of operation thereof will be maintained at its lower constant value by the centrifugal mechanism 96 by reducing the circulating flow of fluid through the conduits 82 and 84 by opening of the motor by-pass valve 94. Under such circumstances, it will be necessary to reduce the operating functions of the unit 30 and the heat transfer effected through the heat coil unit 34, in order to prevent the evaporated refrigerant from being raised to a higher temperature and pressure. Accordingly, when the temperature of the heating coil unit 34 attains predetermined temperature values, the strip heater 78 is energized as hereinbefore indicated to increase the rate of evaporation effected through the unit 30 and also to vent flow through the passage 26 and hence some of the heat therefrom to the atmosphere. Accordingly, the turbine unit 38 is maintained at the constant operating condition to maintain the constant pressure drop of the refrigerant passing therethrough. As a result thereof when the power unit is loaded it will be immediately effective to properly assume the load without requiring any long transition period inasmuch as the power unit continues to operate at a reduced heating but increased refrigerant circulatory rate during stand-by operation.

Referring now to FIGURE 3, a second form of power unit 116 is illustrated therein. The power unit 116 is similar to power unit 10 illustrated and described with respect to FIGURES 1 and 2, except that the outlet conduit 118 from the turbine 38 is directly connected to the chamber 64 of the unit 30 without passing through any precooling heat exchanger. Also, a different type of heat removal facility is provided for the generator 44 in the form of a cooling coil 120 which is disposed about the generator casing and connected by conduits 122 and 124 to the heating coil unit 126. The unit 30 accordingly supplies evaporated refrigerant to the heating coil unit 126 from which a portion thereof is diverted through the one-way check valve 128 to the conduit 122 connected to one end of the cooling coils 120 for circulation therethrough and return by the conduit 124 to the heating coil unit 126. Accordingly, the dissipated heat from the generator 44 may be directly absorbed by portion of the evaporated refrigerant with any remaining dissipated heat being supplied to the circulating air in the passage 26 as explained with respect to the power unit 10. The power unit 116 accordingly differs from the power unit 10 in the removal of the precooling heat exchanger and the additional and more direct manner in which the dissipated heat is absorbed by the evaporated refrigerant. Operation of the power unit 116 is otherwise identical to that of the power unit 10.

Referring now to FIGURE 4 it will be observed that the power unit 128 illustrated therein incorporates the different and more direct manner of transferring the dissipated heat energy from the generator to the evaporated refrigerant in the heating coil unit as described with respect to the power unit 116 of FIGURE 3 and also includes a different type of fluid circulatory system for carrying the heat between the components of the power unit. It will be observed therefore that the power unit 128 includes an insulated chamber 130 within which the evaporator unit 30 is located as well as the heating coil 132. A separate insulated chamber 134 encloses the precooling heat exchanger 136. A connecting duct 138 connects the upper end of the chamber 134 with the upper end of the chamber 130 for fluid communication therebetween. Connected to the duct 138 is an excess heat by-pass passage 140 which is controlled by a valve 144 through the electro-magnetic device 146. The lower end of the insulated chamber 130 is connected by an outlet conduit 148 to the inlet end of a liquid circulating pump 150 the discharge of which is connected to a discharge conduit 152 for supply to the lower end of the chamber 134. Disposed within the chambers 130 and 134 and circulated therebetween within the conducting conduit 138, the outlet conduit 148 and the discharge inlet conduit 152, is an anti-freeze liquid constituting the heat carrier fluid circulated by means of the circulating pump 150 in a counterclockwise direction as viewed in FIG. 4. It will therefore be appreciated that the circulating carrier liquid constitutes a heat carrier in the same sense as the circulating air as described with respect to the power unit 10 in FIGURE 1. In the case of the power unit 128 however, the carrier fluid is circulated by a pump rather than by a fan. It will be observed therefore that the refrigerant circulating pump 32 and the carrier fluid circulating pump 150 will be disposed external to the chambers 130 and 134 inasmuch as the liquid type of carrier fluid must be confined to a greater extent than the air type of carrier fluid. The carrier liquid in passing upwardly in heat exchanging relation to the heat transfer tubes of the heat exchanger 136 will be heated in precooling the downwardly moving refrigerant connected to the condenser unit 30 by the insulated outlet conduit 154 so as to supply the carrier fluid so heated to the upper end of the chamber 130 for heating the evaporated refrigerant within the heater coil unit 132. Also, additional heat for the evaporated refrigerant within the heater coil 132 is provided in a manner similar to the method described with respect to the power unit 116 in FIGURE 3. Accordingly, a portion of the evaporated refrigerant is diverted past one-way valve 128 into the insulated conduit 156 for circulation through dissipated heat removing coil 158 and return therefrom to the heating coil unit 132 by the insulated return conduit 160. The dissipated heat removal coil 158 is accordingly disposed about the electric output generator 162 which otherwise functions in a manner similar to the generators 44 as described with respect to the power units 10 and 116.

As seen from FIGURE 5, control of the strip heater 78 of the power unit 128 is effected in the same manner as described with respect to the power unit 10. However, control of the rate of supply of heat to the heater coil unit 132 by the carrier fluid is effected by connection of the excess heat by-pass 140 of the connecting conduit 138. Ordinarily, the valve 144 closes off the by-pass 140 so that no heat will be lost during the transfer of the carrier liquid from the chamber 134 to the chamber 130. When however it is desired to reduce the heat transfer to the heater coil unit 132 as during stand-by operation of the power unit 128, the electro-magnetic device 146 which is under control of the thremostatic control device 108 will respond to a predetermined temperature of the heater coil unit 132 to open the valve 144 and thereby permit the flow of carrier liquid past the one-way valve 147 into the non-insulated by-pass 140 so as to dissipate the excess heat thereby in order to maintain the turbine 38 operating under the constant pressure drop condition as heretofore mentioned. As indicated in FIGURE 5 the electromagnetic device 146 when operative will be energized by the output of the generator 162. The power unit 128 otherwise operates in a manner indentical to that described with respect to the power units 10 and 116 as far as the corresponding components thereof are concerned.

From the foregoing description, operation and utility of the power units embodying the principles and concepts of the present invention will be apparent. It will be recalled that the power units heretofore described include in common a circulating refrigerant which undergoes evaporation and further heating thereof for supply to a constantly operating turbine through which the evaporated refrigerant undergoes a constant pressure drop. The refrigerant exhausted from the turbine is accordingly returned to a condenser unit for the purpose of condensing the refrigerant into liquid and in so doing give up the heat thereof for the purpose of evaporating pressurized liquid refrigerant. For the purpose of heating the evaporated refrigerant before supply to the turbine, the heat dissipated from the output generator operatively coupled to the turbine by a hydraulic system prevents any energy loss because of unused dissipated heat. Alternatively, additional heat which is supplied to the evaporated refrigerant by a carrier fluid may be provided by the heat exchanger in which the refrigerant leaving the turbine is precooled. Constant operation of the turbine and generator coupled thereto under stand-by and idling conditions, is effected by reducing the flow of heat to the evaporated refrigerant by the carrier fluid and by also providing additional heat from the generator output to the condenser unit so as to increase the evaporating rate thereof to thereby reduce the degree to which the evaporator refrigerant is heated. Accordingly, the controls for increasing the evaporating rate and reducing the supply of heat to the evaporated refrigerant include thermostatic control devices which respond to predetermined temperature values of the evaporated refrigerant prior to supply to the turbine.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A method of producing usable power comprising the steps of: removing kinetic energy from a gas at a constant high pressure to reduce the pressure thereof by a constant amount to a low pressure; condensing the gas at said low pressure into liquid by heat exchange with evaporating liquid; pressurizing the condensed liquid for evaporation into gas; heating the evaporated gas to raise the pressure thereof to said constant high pressure; converting said removed kinetic energy into a different form; removing heat energy dissipated by the conversion of energy; and supplying the heat energy so dissipated to said evaporated gas for said heating thereof to raise its pressure.

2. The method of claim 1, including the steps of controllably increasing the evaporation rate of pressurized liquid into gas and venting the supply of dissipated heat energy to the evaporated gas in accordance with the degree of heating of the evaporated gas to maintain the pressure drop thereof constant in removing the kinetic energy therefrom.

3. The method of claim 2, wherein the step of converting the kinetic energy into a more useful form comprises the steps of: passing the high pressure gas through a turbine to impart motive power thereto; supplying said motive power to an output generator for delivery of useful energy and to effect circulation of said liquid and gas.

4. The method of claim 3 including the steps of circulating fluid for removal of the dissipated heat energy and for supply of heat energy by the fluid so heated to the evaporated gas; and further cooling said fluid following supply of heat energy to the evaporated gas by the heat exchange between the condensing low pressure liquid and the evaporating pressurized liquid.

5. The method of claim 1, wherein the step of converting the kinetic energy into a more useful form comprises the steps of: passing the high pressure gas through a turbine to impart motive power thereto; supplying said motive power to an output generator for delivery of useful energy.

6. The method of claim 1 including the steps of circulating fluid for removal of the dissipated heat energy and for supply of heat energy by the fluid so heated to the evaporated gas; and further cooling said fluid following supply of heat energy to the evaporated gas by the heat exchange between the condensing low pressure liquid and the evaporating pressurized liquid.

7. The method of claim 6, including the step of precooling the low pressure gas by the circulating fluid.

8. The method of claim 1, wherein the steps of removing the dissipated heat energy and supply thereof to the evaporated gas include: diverting a portion of the evaporated gas to receive said dissipated heat energy.

9. The method of claim 8, wherein the step of converting the kinetic energy into a more useful form comprises the steps of: passing the high pressure gas through a turbine to impart motive power thereto; supplying said motive power to an output generator for delivery of useful energy.

10. The method of claim 9 including the steps of circulating fluid for removal of the dissipated heat energy and for supply of heat energy by the fluid so heated to the evaporated gas; and further cooling said fluid following supply of heat energy to the evaporated gas by the heat exchange between the condensing low pressure liquid and the evaporating pressurized liquid.

11. The method of claim 10, including the steps of controllably increasing the evaporation rate of pressurized liquid into gas and venting the supply of dissipated heat energy to the evaporated gas in accordance with the degree of heating of the evaporated gas to maintain the pressure drop thereof constant in removing the kinetic energy therefrom.

12. A power unit comprising, means for removing kinetic energy from a constant high pressure gas and thereby reduce the pressure thereof by a constant amount, heat exchanger means operatively connected to the kinetic energy removing means for converting the low pressure gas exhausted therefrom into liquid by heat exchange with evaporating liquid, pressure means operatively connected to the heat exchanger means to pressurize and circulate the condensed liquid received therefrom for supply thereof to the heat exchanger means for evaporation therewithin, heating means operatively connected to the heat exchanger means and the energy removing means for heating the evaporated gas received from the heat exchanger means to supply the constant high pressure gas to the energy removing means, converting means operatively connected to the energy removing means for converting the kinetic energy into useful form, heat removal means for removing heat energy dissipated by the converting means, and heat conducting means operatively connected to the heat removing means for supply of the dissipated heat energy to the heating means.

13. The combination of claim 12 including means operatively connected to the heat exchanger means for increasing the liquid refrigerant evaporating rate therethrough, means for venting the supply of dissipated heat energy to the heating means by the dissipated heat conducting means, and control means operatively connected to the means for increasing the evaporating rate and the heat venting means for control thereof in accordance with the temperature of the heating means.

14. The combination of claim 13 wherein said heat conducting means includes fluid circulating means for supplying cooled fluid to the converting means for removal of dissipated heat energy therefrom and supply of said heat energy to the heating means.

15. The combination of claim 14, wherein said heat exchanger means includes insulation means for partial insulation thereof from the fluid in the fluid circulation means to which the heat exchanger means is exposed for cooling of the fluid prior to supply thereof to the converting means for heat removal purposes.

16. The combination of claim 12 wherein said heat conducting means includes fluid circulating means for supplying cooled fluid to the converting means for removal of dissipated heat energy therefrom and supply of said heat energy to the heating means.

17. The combination of claim 16, including precooling means operatively connected to the energy removing means and heat exchanger means for receiving the low pressure gas from the energy removing means to reduce the temperature thereof by heat exchange with the fluid of the fluid circulating means prior to supply of the low pressure gas to the heat exchanger means.

18. The combination of claim 1, wherein the heat removal means includes means operatively connected to the heating means for diverting a portion of evaporated gas therefrom and circulating said diverted gas about the converting means to absorb dissipated heat energy therefrom for return to the heating means.

19. A power unit comprising turbine means, heat exchanger means for receiving low pressure gaseous refrigerant for conversion into liquid refrigerant by a heat exchange with evaporating pressurized refrigerant, refrigerant circulating means operatively connected to the heat exchanger means for receiving low pressure liquid refrigerant therefrom and supplying pressurized refrigerant thereto for evaporation therewithin, heating coil means operatively connecting the heat exchanger means to the turbine means for supply of a constant high pressure gaseous refrigerant thereto, precooling means operatively connecting the turbine means to the heat exchanger means to reduce the temperature of the low pressure gaseous refrigerant exhausted from the turbine means, output speed controlled motor-pump drive means drivingly connected to the turbine means, output generator means driven by the motor pump drive means, heat removal coil means disposed about the generator means and operatively connected to the heating coil means for circulating a diverted portion of the evaporated refrigerant from the heating coil means about the generator means to absorb dissipated heat energy therefrom, insulated closed circuit passage means disposed about the heat exchanger means, precooling means and heating coil means, fluid circulating means operatively connected to the insulated passage means for circulating carrier fluid therethrough for heat exchange with the heat exchanger means, heating coil means and precooling means, insulation means disposed about the heat exchanger means for exposing only a portion thereof to the carrier fluid, strip heating means embedded in the insulation means for increasing the evaporating rate in the heat exchanger means and flow of refrigerant in the heating coil means, flow control means disposed in the insulated passage means for venting the supply of heat by the carrier fluid to the heating coil means, control means responsive to the temperature of the heating coil means and operatively connected to the strip heating means and flow control means for controlling operation thereof.

20. A power unit comprising turbine means, heat exchanger means for receiving low pressure gaseous refrigerant for conversion into liquid refrigerant by heat exchange with evaporating pressurized refrigerant, refrigerant circulating means operatively connected to the heat exchanger means for receiving low pressure liquid refrigerant therefrom and supplying pressurized refrigerant thereto for evaporating therewithin, heating coil means operatively connecting the heat exchanger means to the turbine means for supply of a constant high pressure gaseous refrigerant thereto, means operatively connecting the turbine means to the heat exchanger means, output speed-controlled motor-pump drive means drivingly connected to the turbine means, output generator means driven by the motor-pump drive means, insulated closed circuit passage means disposed about the heat exchanger means, and heating coil means, fluid circulating means operatively connected to the insulated passage means for circulating carrier fluid therethrough and directing heat energy dissipated by the generator means during operation thereof into the insulated passage means, insulation means disposed about the heat exchanger means for exposing only a portion thereof to the carrier fluid, strip heating means embedded in the insulation means for increasing the evaporating rate in the heat exchanger means and flow of refrigerant in the heating coil means, flow control means disposed in the insulated passage means for venting the supply of heat by the carrier fluid to the heating coil means, temperature control means responsive to the temperature of the heating coil means and operatively connected to the strip heating means and flow control means for controlling operation thereof.

References Cited in the file of this patent

UNITED STATES PATENTS

| | | |
|---|---|---|
| 2,714,670 | Linder et al. | Aug. 2, 1955 |
| 2,737,031 | Wulle | Mar. 6, 1956 |